United States Patent [19]

Hardee

[11] Patent Number: 4,982,811
[45] Date of Patent: Jan. 8, 1991

[54] FLUID DRIVEN TORSIONAL DIPOLE SEISMIC SOURCE

[75] Inventor: Harry C. Hardee, Albuquerque, N. Mex.

[73] Assignee: The United States of America as represented by the United States Department of Energy, Washington, D.C.

[21] Appl. No.: 390,810

[22] Filed: Aug. 8, 1989

[51] Int. Cl.$^5$ .............................................. G01V 1/40
[52] U.S. Cl. .................................. 181/106; 181/119; 181/121; 367/75
[58] Field of Search ..................... 367/75, 81, 84, 912; 181/106, 119, 121; 175/40, 50; 73/151, 152

[56] References Cited

U.S. PATENT DOCUMENTS

| 4,103,756 | 8/1978 | Trulio et al. | 181/121 |
| 4,116,301 | 9/1978 | Fair | 181/119 |
| 4,283,779 | 8/1981 | Lamel | 175/40 |
| 4,702,343 | 10/1987 | Paulsson | 181/106 |
| 4,715,470 | 12/1987 | Paulsson | 181/106 |
| 4,805,727 | 2/1989 | Hardee et al. | 181/106 |

FOREIGN PATENT DOCUMENTS 0672588  7/1979  U.S.S.R. .

OTHER PUBLICATIONS

P. Heelan, "Radiation From A Cylindrical Source of Finite Length", Geophysics, vol. 18, 1953, pp. 685–696.
P. Lodde, "Review of Wave Propagation Techniques For Determining The In Situ High–Amplitude Shear Behavior of Geologic Materials", AFWL-TR-79-152, University of New Mexico, 09/80, pp. 92 and 106.
J. White, "Underground Sound, Application of Seismic Waves", Methods in Geochemistry and Geophysics, vol. 18, Elsevier, NY, 1983, pp. 197, 199, and 207–208.
M. Billings, Structural Geology, 2d ed., Prentice-Hall, Inc., 1954, pp. 403–405 and 410–411.
Leet et al., Physical Geology, 3d ed., Prentice-Hall, Inc., 1965, p. 351.
W. Mason, Physical Acoustics and the Properties of Solids, D. Van Nostrand Company, Inc. 1950, p. 35.
Wheeler et al., Oil–From Prospect to Pipeline, Gulf Publishing Company, 1958, pp. 18–19.

Primary Examiner—Charles T. Jordan
Assistant Examiner—J. Woodrow Eldred
Attorney, Agent, or Firm—Anne D. Daniel; James H. Chafin; William R. Moser

[57] ABSTRACT

A compressible fluid powered oscillating downhole seismic source device capable of periodically generating uncontaminated horizontally-propagated, shear waves is provided. A compressible fluid generated oscillation is created within the device which imparts an oscillation to a housing when the device is installed in a housing such as the cylinder off an existing downhole tool, thereby a torsional seismic source is established. Horizontal waves are transferred to the surrounding bore hole medium through downhole clamping.

23 Claims, 1 Drawing Sheet

U.S. Patent   Jan. 8, 1991   4,982,811
FIG. 1
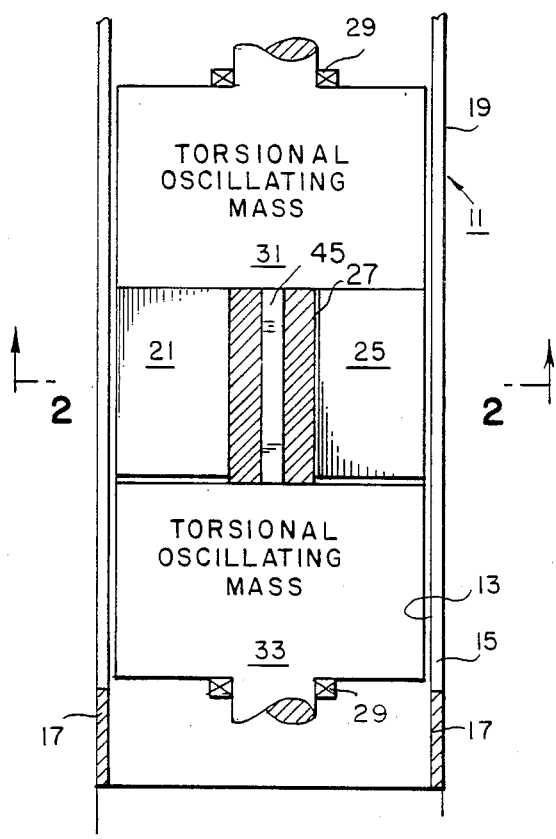
FIG. 3
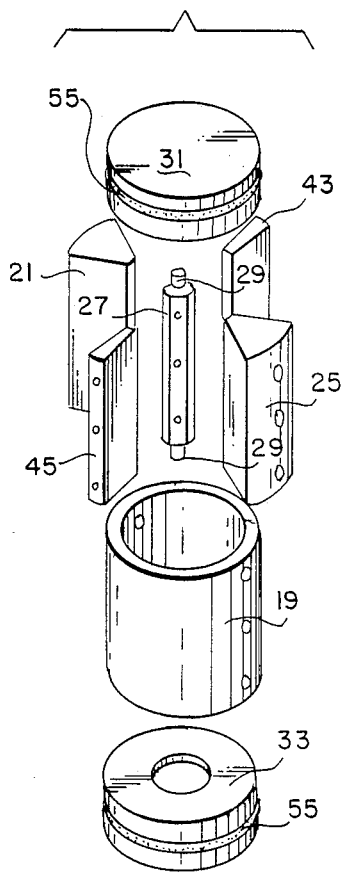
FIG. 2
FIG. 4

FLUID DRIVEN TORSIONAL DIPOLE SEISMIC SOURCE

GOVERNMENT CONTRACT

The Government has rights in this invention pursuant to Contract No. DE-AC04-76DP00789 awarded by the United States Department of Energy to AT&T Technologies, Inc.

FIELD OF THE INVENTION

This invention relates to a fluid driven seismic source within a compressible fluid powered oscillator used in seismic prospecting or exploration and, more particularly, relates to a seismic source capable of producing shear waves whose peak energy direction or energy "lobe" is in the horizontal direction.

DESCRIPTION OF THE PRIOR ART

Seismic techniques are useful in mapping subterranean structures, specifically those associated with petroleum deposits. Seismic methods can be used to recognize the presence of rock bodies, to determine the depth and dip of bed and contacts, and to delineate folds, faults and salt domes (M. Billings, *Structural Geology*, 2d ed. (Prentice-Hall, Inc. 1954), p. 410–411).

Seismic prospecting is based upon knowledge of earthquake waves. Artificially generated waves are useful because they are reflected at the boundaries of solids or certain differences in subterranean densities. When they bounce back to the surface, an instrument, such as a geophone, receives, amplifies and records their time of arrival. From this information, the depth to which the waves have traveled can be computed and, through a series of such measurements, an entire subterranean structure can be plotted (Leet & Judson, *Physical Geology*, 3d ed. (Prentice-Hall, Inc. 1965), p. 351).

Separate waves are created when energy is imparted into a medium by a disturbance. Typically, a wave is propagated very well by a medium that has inertia and elasticity and in which displaced particles transfer momentum to adjoining particles and are then restored to their original position. These waves are what is measured in seismic testing.

One type of seismic testing involves placing the point at which the wave is to be generated, i.e., the seismic source, in a straight line with five to ten receiving or sensor points. The waves which bounce back are recorded. This has become known as cross hole testing.

The location of the seismic source is then reversed so that it is placed at the point where the furthest receiver was and vice versa. A wave is then generated (M. Billings, supra at 403–5). This reversed polarity technique makes identification of the shear wave arrival definite. This technique is necessary because the interference of P-waves (pressure) with vertical shear waves ($S_V$-waves) often obscures the arrival of the shear wave. This technique would be unnecessary if a source of purely horizontal shear waves ($S_H$-waves) became available. Thus, the efficiency of the mapping technique would be increased.

Shear waves are those in which the particle motion is at right angles to the direction in which the waves are traveling. $S_H$-waves are preferred over $S_V$-waves because they are, in theory, less contaminated by P-wave energy, which is characterized by changes in volume and by particle motion in a direction parallel with the direction of wave movement. P-waves or compressional waves cause particle motion in both vertical and radial directions, but not in the tangential direction (P. Lodde, Review of Wave Propagation Techniques for Determining the In Situ High-Amplitude Shear Behavior of Geological Materials (University of New Mexico, September 1980), p. 106). In contrast, pure shear waves cause a change in shape without a change in volume. In addition, torsional or horizontal shear waves are advantageous because their velocity is independent of frequency (W. Mason, *Physical Acoustics and the Properties of Solids*, (D. Van Nostrand Company, Inc. 1950), p. 35).

While it has been recognized that horizontal shear ($S_H$) waves may be useful in seismic prospecting, little use has been made of them because their arrival at receiving or sensor points is usually obscured by background noise or interference from the vertical shear ($S_V$) and P-waves.

Previously, attempts to construct a torsional dipole source (a source that generates only pure horizontal shear waves) have failed. Specifically, attempts have been made to create a torsional source for use in cross hole seismic testing. Most cross hole testing up until a few years ago was with impulsive sources, i.e., one which involves the generation of a very short, single pulse of energy by striking a blow on a rod placed in a vertical bore hole. A vertical transducer, which is placed to the same depth in another bore hole, measures horizontally propagating waves. These prior art torsional devices have comprised two basic design approaches. The first is a torque foot and torque rod structure. The second is a spinning flywheel (Lodde, id. at 92). It has been found that both of these design approaches generate both shear and compressional forces. This is because it is difficult to construct a balanced, symmetrical torsional source. Therefore, although in theory, such prior art devices would generate only horizontally-propagated, horizontal shear waves, in practice, these sources have generated large amounts of compressional energy, resulting in the contamination of torsional $S_H$-waves with P-wave energy (Lodde, id. at 106).

In the last few years, a large part of the effort with new sources for cross hole testing has concentrated on swept frequency, continuous sources. Most of these have been of the P or $S_V$ type although there have been a few $S_H$ types.

Because these prior art devices were unable to provide a torsional source, others tried to solve the problem of P-wave interference with $S_V$-waves by creating a seismic source capable of propagating high-amplitude waves for longer distances. At a certain distance, P-waves and $S_V$-waves separate into two separate waves and if the sensors are placed at a location beyond where this separation occurs, more accurate readings of the $S_V$ waves, which travel further in the horizontal direction than do the P-waves, are possible. However, these high-amplitude waves are capable of destroying a bore hole.

Typically, drilling commences with a hole, often one foot in diameter and one hundred feet deep. A surface pipe is then cemented into this opening. The main drilling operation continues with a bit no larger than seven to nine inches in diameter (Wheeler and Whited, *OIL-From Prospect to Pipeline*, (Gulf Publishing Company 1958), p. 18–19). It is within this diameter that a seismic source must fit. Thus, a device must be capable of generating seismic waves which can be detected in another well or from the surface without destroying the bore hole or separating the cement liner from the bore hole.

The development of a source capable of propagating nondestructive high-amplitude seismic waves was the focus of other devices. Paulsson, in U.S. Pat. No. 4,702,343, shows a nondestructive downhole seismic vibrator source and U.S. Pat. No. 4,715,470 shows a downhole electromagnetic seismic source. Both of these devices were designed to generate compressional (P) and both vertical and horizontal shear waves ($S_V$ and $S_H$). These devices require a sensor at great distances. Although Paulsson has mentioned both $S_H$ and $S_V$-waves, he tested only a P-wave version. His speculation about $S_H$ and $S_V$-wave generation has gone unsubstantiated by actual working models to date.

The generation of a pure horizontal shear wave ($S_H$-wave) would permit a sensor to be closer to the seismic source and eliminate the need for destructive high-amplitude seismic waves as well as allow for greater accuracy in measurement. The generation of solely horizontal shear waves permits an operation of a lower amplitude (power) seismic source and a closer placement of the receiver. This permits greater accuracy in determining the arrival time of the wave at the sensor and thereby increase mapping accuracy.

What is desired is a device capable of generating pure horizontally-propagating, horizontal shear ($S_H$) waves.

Also desired is such a horizontal shear wave generator which is capable of fitting within the restricted dimensions of a bore hole and within the dimensions of existing bore hole tools and of generating seismic waves without damaging the bore hole or any structure within it.

It is further desired that such a device utilize existing tool bore hole clamping.

SUMMARY OF THE INVENTION

The objects of the present invention are accomplished by a device that is a periodic torsional oscillator for generating lateral seismic waves. This oscillator is driven by a compressible fluid rotary valve which will convert an existing downhole tool into a seismic source capable of generating pure horizontal shear waves.

This device comprises a sleeve which fits into the bore or inside diameter of an existing downhole tool. Two fixed vanes are attached to the inside wall of the sleeve and thereby form dual semicircular chambers. As an alternative to the use of an existing downhole tool housing, a custom seismic housing can be utilized.

A spindle, centrally located within the sleeve, is fixed between bearings and supports two movable vanes. This structure creates a vane piston. These movable vanes are alternately pushed clockwise and counterclockwise by gas supplied from the existing tool.

Porting blocks direct the gas against the movable vanes. Cushions of compressed gas are used to slow the movable vanes at the end of each cycle.

The vane piston is connected to two large oscillating inertial masses, one located above and one below the vane chamber. Reaction pressure against the two fixed vanes, these being the stationary segments of the vane chamber, cause the sleeve housing of the tool to oscillate. This reaction oscillation is coupled to the bore hole through a clamp and thus imparts the horizontal or lateral generated wave into the surrounding medium.

DESCRIPTION OF THE DRAWINGS

The structural features, operation and advantages of the present invention will be better understood from a reading of the following Detailed Description of the Invention with the accompanying drawings in which like numerals refer to like elements and in which:

FIG. 1 shows a cross sectional elevational view of the torsional oscillator pneumatic powered seismic source device positioned within a downhole tool which is clamped to a bore hole;

FIG. 2 shows a plan cross sectional view taken along line 2—2 of FIG. 1 through the vane piston;

FIG. 3 shows a dissection of the seismic source oscillating vane piston and chamber structure; and FIG. 4 shows a sketch of tangential stress forces Tg(t) imparted by the device.

DETAILED DESCRIPTION OF THE INVENTION

The present invention, FIG. 1, is a compressible fluid powered oscillating downhole seismic source device 11. The device 11, is installed within the cylinder 13 of a downhole bore tool or a custom housing. The downhole bore tool cylinder 13 is held to a bore hole 15 by clamps 17 of the type described in U.S. Pat. No. 4,805,727. The device 11 is capable of generating horizontally-propagated shear waves which are transferred to the downhole tool cylinder wall 13 and from there to the bore hole 15.

This device 11, while its size can be varied, is constructed to fit within a cylinder with a four or five inch diameter. It is also adaptable to fit within other cylinders. When installed, the device 11 will convert an existing compressible fluid downhole tool 13 into a seismic source capable of generating pure $S_H$-waves which are horizontally-propagated, horizontal shear waves. The device 11 utilizes the inert gas, typically argon, available in the downhole tool for power.

The device 11 incorporates a sleeve 19 which is of a size to fit within the inside pipe or tube diameter 13 of the existing downhole tool. Two fixed vanes 21, 25 are securely attached to the inner wall of the sleeve 19 at diagonally opposed positions. These vanes 21, 25 form a vane piston portion of the device 11.

Extending through this vane piston portion of the device 11 is a central spindle or shaft 27, supported between a pair of fixed bearings 29. Solid cylinder or toroidal shaped torsional oscillating masses 31 and 33 are mounted on this central spindle 27 above and below, respectively, the vane piston portion.

The vane piston portion can better be seen in the cross sectional view, FIG. 2. The two fixed vanes 21, 25 are essentially pie-shaped with a portion at the center of the cylinder 19 removed from the central spindle 27. Passing through each fixed vane 21, 25 is a respective inlet gas passageway 35, 37, with the first inlet passageway 35 passing through the first fixed vane 21 and the second inlet 37 passing through the second fixed vane 25.

A pair of porting blocks 39, 41 positioned one each adjacent a respective fixed vane 21, 37 establish the size and shape of each gas inlet 35, 37. These porting blocks 39, 41 direct the inlet gas flat against movable vanes 43, 45.

These movable vanes 43, 45 are connected onto the central spindle 27 and operate in the voids between the fixed vanes 21, 25. These voids form a first arc shaped cylinder 47 in which the movable vane 43 operates as a piston, and a second arc shaped cylinder 49 in which the movable vane 45 operates as a piston. The end walls of the arced cylinders 47, 49 in which the movable vanes 43 and 45 operate are established by the faces of the torsional masses 31 and 33.

A first exhaust port 51 is located partially around the arced wall of the first operating cylinder 47 in which the movable vane 43 operates. A second exhaust port 53 is likewise positioned partially around the arc wall of the second operational cylinder 49 in which the second movable vane 45 operates. The voids defining the operational cylinders 47 and 49 each transverse an arc angle of about 120 to 130 degrees.

Referring to FIG. 3, a dissection of the device 11, the torsional oscillating masses 31 and 33 can easily be seen to be approximately toroidal shaped. The central spindle 27 extends between the bearings 29 with one of the torsional masses 31, 33 positioned on each end of the central spindle 27.

The fixed vanes 21, 25 can be seen to be bolted or otherwise brazed to the sleeve 19. Similarly, the movable vanes 43, 45 can be bolted onto the central spindle 27.

The central spindle 27 can be made of stainless steel, such as 304 stainless, and the bearings 29 can be tapered roller bearings or sleeve bearings available in the marketplace from SKF Industries or other manufacturers. Other types of bearings which can withstand the stresses of the device 11 can be substituted.

FIG. 4 shows the tangential stress forces imparted by the device 11 on the downhole tool casing 13 and thereby onto the bore 15.

The downhole tool has normally supplied to it pulsating bursts of compressible fluid. This gas is used by the device and directed by porting blocks 39, 41, of FIG. 2, against the respective movable vanes 43, 45. As the vanes 43, 45 begin to move clockwise away from the inlet gas ports 35, 37, the oscillating masses 31, 33 develop rotational momentum. As can be seen from FIG. 1, the masses 31, 33 are connected to the movable vanes 43 and 45 and rotate when the movable vanes 43, 45 begin to rotate on the central spindle 27. These oscillating masses 31, 33 each carry an annular seal 55, FIG. 3, which seals the walls of the cylinder chambers 47, 49 so that the gases which are forced into the chambers 47, 49 through the inlets 35, 37 exhaust through the outlet ports 51, 53, only.

As the vanes 43, 45 begin to move, back pressure is relieved by the exhausting of back side gas through the exhaust ports 51, 53. After the vanes 43, 45 pass by the exhaust ports 51, 53, inlet gas no longer operates to force movement of the vanes 43, 45 as it is shunted out of the sleeve 19 through the exhaust ports 51, 53. The momentum built up by the movement of the vanes 43, 45 and the oscillating masses 31, 33 creates a continuing rotational movement which causes the vanes to continue to rotate clockwise until the gas trapped between the movable vanes 43, 45 and the respective fixed vanes 25, 21 is compressed. As this compression increases, the sleeve 19 is oscillated in a clockwise motion by the gas effect on the fixed vanes 25, 21 and a smooth oscillatory motion is imparted to the surrounding formation. The most significant vector of this motion is in the horizontal plane.

The torsion exerted on the sleeve 19 and thereby transferred to the tool wall 13 creates a horizontal periodic oscillation which is transmitted into the bore 15 and its adjacent medium. Thereafter, the compressed gas builds up in the space between the movable vanes 43, 45 and the fixed vanes 25, 21 to "brake" the rotational movement of the movable vanes 43, 45. This gas pressure then causes the vanes 43, 45 to oscillate in a reverse or counterclockwise direction. The vanes 43, 45 then move back towards the inlet ports 35, 37. To assist in this backward movement, the flow of gases could be reversed from exhaust to inlet temporarily after the vanes 43, 45 pass their respective exhaust ports 51, 53.

Thus, the movable vanes 43, 45 serve as a pair of ported pistons and, together with the spindle 29, create a rotary valve action which cooperates with the inlet ports 35, 37 and the exhaust ports 51, 53 to allow the release of gas from the arc cylinders 47, 49 when the movable vanes 43, 45 pass their respective exhaust ports 51, 53 on the counterclockwise return stroke.

The device, therefore, has a clockwise rotational power stroke under gas pressure and a counterclockwise return stroke under compressed trapped gas pressure. At the end of each power stroke, the trapped gas which is compressed against the fixed vanes 25, 21 cushions the movement of the respective movable vanes 43, 45 so that a definite torque is imparted onto the sleeve 19. Therefore, a hard metal hammer effect sufficient to cause eventual destruction to either the tool or the bore hole is avoided. Moreover, "shocks" and "hammer effects" which contain considerable high frequency energy, which type of energy is rapidly attenuated, are likewise avoided.

The device 11 is operated in an oscillating-reciprocating motion and thereby creates a torsional oscillator. Shear waves are generated at the end of each power stroke in identical, regular repeating intervals and with a repeatable amplitude.

The shear or tangential stress created by the oscillation of the device 11 acts circumferentially on the bore cylinder 19. This causes radiated displacement which is the distance an oscillating object will travel from its equilibrium position, and which is given by the following equations:

$$u_r = 0$$

$$u_\theta = -[(a^2 dT \sin \phi)/(4 \mu Br)]g'(t - r/B)$$

$$u_\phi = 0$$

where a is the radius of the radiating cylinder, d is the length of the radiating cylinder, Tg' (t) is the transient tangential stress produced by the cylindrical source on the surface of the hole, t is time, B is shear wave velocity in the surrounding medium, $\mu$ is the shear modulus in the surrounding medium, r is radius from the center of the hole or cylinder, $\theta$ is the azimuthal angle in spherical coordinates, $\phi$ is the polar angle in spherical coordinates referenced to the center of the source.

The torsional (horizontal) dipole source device of the present invention may be used in conjunction with a vertical dipole source which generates vertical shear (S$_V$) waves. When used together, these two sources complement each other.

Changes can be made in the above invention without departing from the scope and intent thereof. It is intended, therefore, that the above disclosure be interpreted as illustrative of the invention and not that the invention be limited thereto.

What is claimed is:

1. A fluid operated downhole torsional seismic source, which is operable under downhole compressible fluid, comprising, a cylindrical sleeve a first pair of openings in said cylindrical sleeve;

a second pair of openings in said cylindrical sleeve;

two fixed vanes wherein each of said vanes is securely attached to the interior of said sleeve, each of said vanes being adjacent to one of said openings of said first pair of openings whereby said fixed vanes form two chambers within said sleeve;

a first and a second porting block, each being attached to the interior portion of said sleeve adjacent to one of said first pair of openings, thereby forming channels into each of said chambers between each of said fixed vanes and said first and second porting blocks;

a movable spindle being located centrally within said sleeve and fixed between bearings;

two movable vanes being rigidly supported by said central movable spindle wherein said movable vanes separate each of said chambers into dual sectors;

a first mass located at the top of said central spindle above said sleeve and connected to said spindle and said movable vanes;

a second mass located at the bottom of said central spindle below said sleeve and connected to said spindle and said movable vanes;

means for clamping said source to a bore hole; and means, connected to said sleeve, for supplying a pulsating flow of pressurized compressible fluid into said cylindrical sleeve through said channels formed by said porting blocks and against said movable vanes, thereby causing reciprocal rotation of said movable vanes, said spindle, and said masses in alternating directions, and generating horizontally propagating, horizontally polarized shear waves that are transmitted through the clamping means into the surrounding medium.

2. The fluid operated downhole seismic source of claim 1 wherein the source is placed into a bore of a downhole tool.

3. The fluid operated downhole seismic source of claim 2, wherein said means for supplying pressurized compressible fluid is said downhole tool.

4. The fluid operated downhole seismic source of claim 2 wherein the source is capable of being placed in a bore of about four inches in diameter.

5. The fluid operated downhole seismic source of claim 3 wherein the seismic waves are periodically generated.

6. The fluid operated downhole seismic source of claim 1 wherein the spindle is of stainless steel and the remainder of the assembly is of brass.

7. The fluid operated downhole seismic source of claim 3 wherein said compressible fluid is argon.

8. The fluid operated downhole seismic source of claim 1 wherein each of the openings in said first pair of openings is located on diametrically opposite sides of the circumference of said sleeve.

9. The fluid operated downhole seismic source of claim 8 wherein each of the openings in said second pair of openings is located on diametrically opposite sides of the circumference of said sleeve and each being evenly spaced apart from each of said first pair of openings.

10. A bore hole horizontal shear wave seismic source device, comprising:

a housing a rotational mass positioned within said housing;

piston means within said housing;

a supply of pressurized gas connected to said housing for contacting said piston means and thereby imparting a horizontal rotational momentum to said rotational mass and said piston means;

rotational impact means within said housing for absorbing the horizontal rotational momentum from said rotational mass and said piston means; and a clamping structure between said housing and said bore hole for holding said housing positionally therein, whereby horizontally propagating, horizontally polarized shear waves are generated and transmitted through said clamping structure into the surrounding medium.

11. The device of claim 10 wherein said housing includes a plurality of chambers each acting as piston cylinders, and wherein said piston means includes a plurality of pistons operating one each in each said chamber, and wherein each of said pistons is attached to a central spindle, said rotational mass being attached thereto.

12. The device of claim 11 wherein each said cylinder chamber is arc shaped about said housing and wherein said central spindle extends vertically through the center of said housing.

13. The device of claim 12 wherein said rotational impact means includes a plurality of fixed vanes positioned about the housing and extending from said housing wall to said central spindle, said fixed vanes defining the space comprising each said arc shaped cylinder chamber.

14. The device of claim 13 wherein said piston means includes a plurality of movable vanes, each attached to said central spindle and operating one each in one of said arc shaped cylinder chambers.

15. The device of claim 14 wherein said pressurized gas is supplied to each said arc shaped cylinder chamber through a respective inlet port.

16. The device of claim 15 wherein each said fixed vane also includes a respective porting block, each said porting block operating to direct the flow of inlet gas against a respective movable vane.

17. The device of claim 16 wherein each said porting block directs said inlet gas flat against said respective movable vane.

18. The device of claim 15 also including an exhaust port in each arc shaped cylinder chamber and extending through said housing at a position rotated around said housing from a respective inlet port.

19. The device of claim 12 wherein said plurality of arc shaped cylinder chambers is two chambers.

20. The device of claim 19 wherein each said arc shaped cylinder chamber extends about an arc of 120 to 130 degrees.

21. The device of claim 20 wherein said rotational mass is a pair of toroidally shaped masses positioned above and below said two arc shaped chambers, and attached to said central spindle to rotate therewith.

22. The device of claim 21 wherein said toroidally shaped masses form the closed end top and bottom walls of said two arc shaped chambers.

23. The device of claim 22 also including a seal between each said toroidally shaped mass and said housing.

* * * * *